No. 857,730. PATENTED JUNE 25, 1907.
A. B. GOODSPEED.
INTERNAL COMBUSTION ENGINE.
APPLICATION FILED APR. 12, 1904.
6 SHEETS—SHEET 3.
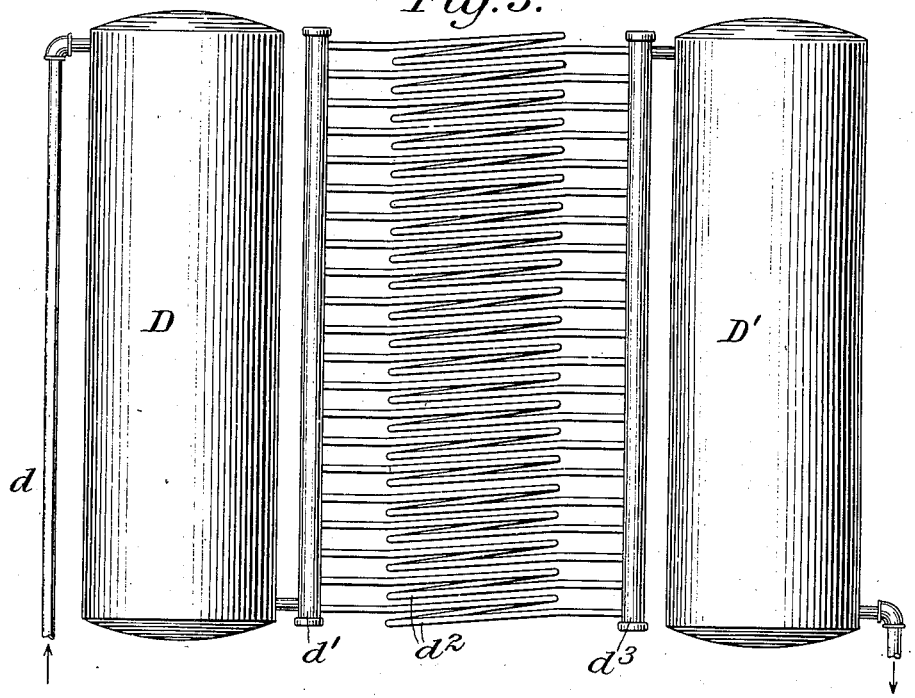
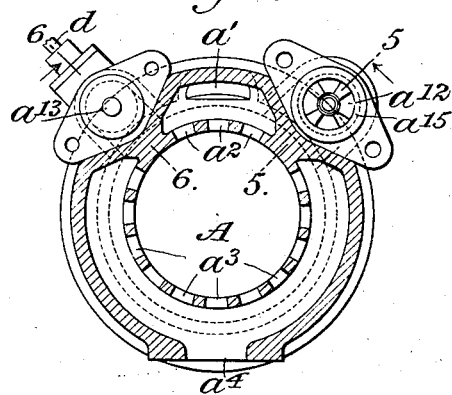
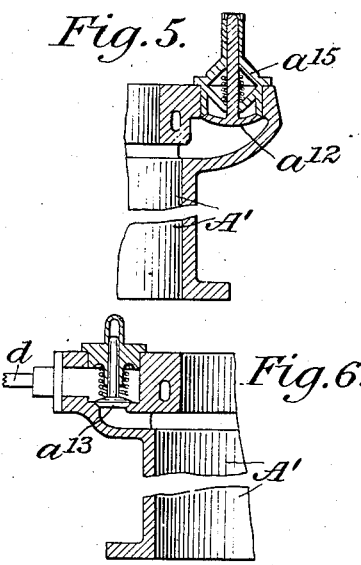
Witnesses:
Chas. D. King
A. N. Jesbera
Inventor:
Arthur B. Goodspeed
by Redding, Kiddle & Greeley
Attys.

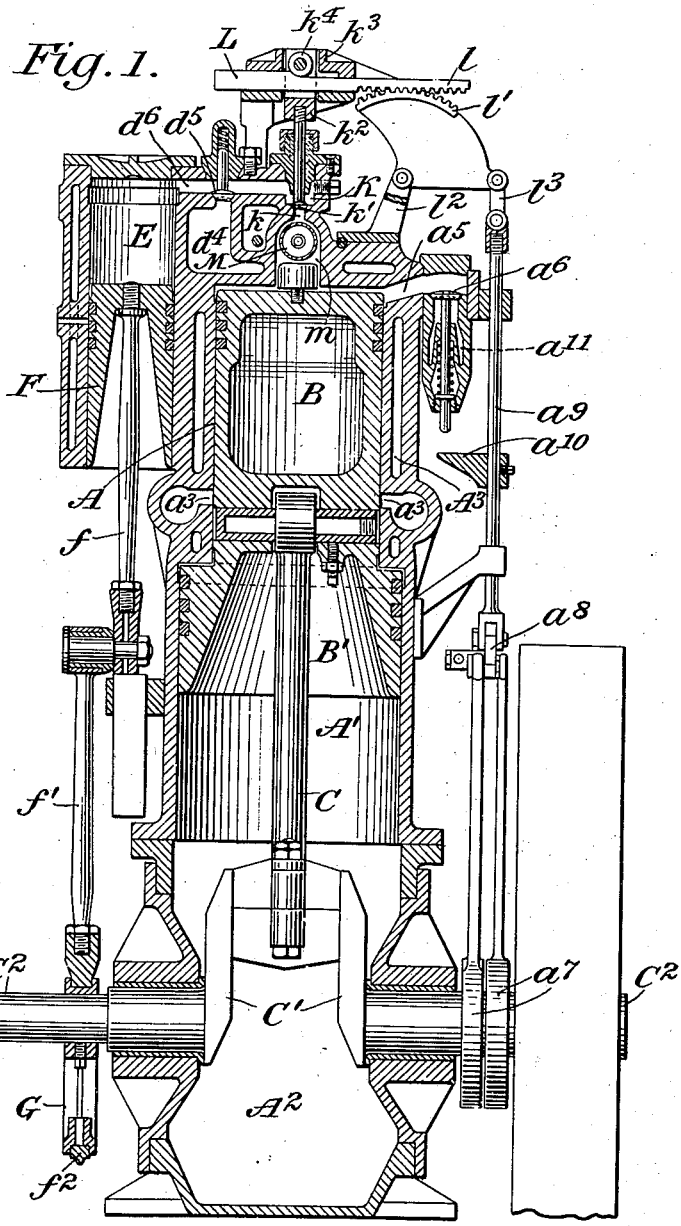

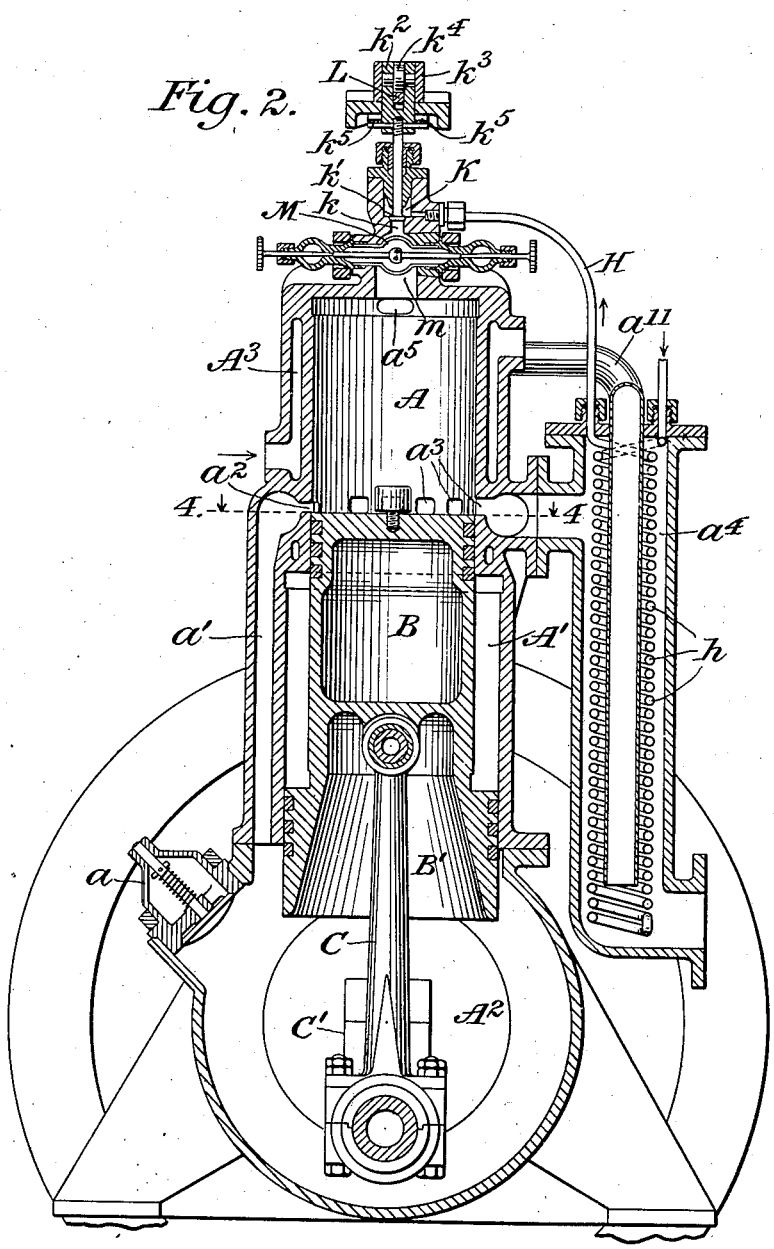

No. 857,730. PATENTED JUNE 25, 1907.
A. B. GOODSPEED.
INTERNAL COMBUSTION ENGINE.
APPLICATION FILED APR. 12, 1904.

6 SHEETS—SHEET 4.

Witnesses:
Chas. W. King.
H. N. Jesbera.

Inventor:
Arthur B. Goodspeed
by Redding, Kiddle & Greeley
Attys.

No. 857,730. PATENTED JUNE 25, 1907.
A. B. GOODSPEED.
INTERNAL COMBUSTION ENGINE.
APPLICATION FILED APR. 12, 1904.

6 SHEETS—SHEET 5.

Witnesses:
Chas. D. King.
A. N. Jesbira.

Inventor:
Arthur B. Goodspeed
by Redding, Kiddle & Greeley
Attys.

No. 857,730. PATENTED JUNE 25, 1907.
A. B. GOODSPEED.
INTERNAL COMBUSTION ENGINE.
APPLICATION FILED APR. 12, 1904.

6 SHEETS—SHEET 6.

Witnesses:
Chas. D. King
A. N. Jesbera

Inventor:
Arthur B. Goodspeed
by
Redding, Kiddle & Greeley
Attys.

UNITED STATES PATENT OFFICE.

ARTHUR B. GOODSPEED, OF EAST ORANGE, NEW JERSEY, ASSIGNOR TO INDUSTRIAL DEVELOPMENT COMPANY, OF NEW YORK, N. Y., A CORPORATION OF NEW YORK.

INTERNAL-COMBUSTION ENGINE.

No. 857,730.　　　　Specification of Letters Patent.　　　Patented June 25, 1907.

Application filed April 12, 1904. Serial No. 202,720.

*To all whom it may concern:*

Be it known that I, ARTHUR B. GOODSPEED, a citizen of the United States, residing in East Orange, in the State of New Jersey, have invented certain new and useful Improvements in Internal-Combustion Engines, of which the following is a specification, reference being had to the accompanying drawings, forming a part hereof.

This invention relates in general to engines of the type of construction illustrated in Letters Patent of the United States No. 671,526, dated April 9th, 1901, but it is not restricted in its application to engines which operate only upon the principle of hot air engines, so called.

The objects of the invention are generally to secure a better co-relation of the several operations in each cycle, to insure greater certainty and positiveness in operation, particularly through better control of the admission of the fuel which forms the basis of combustion, to provide also for reversal of the improved engine, and to attain greater efficiency.

Figure 7:
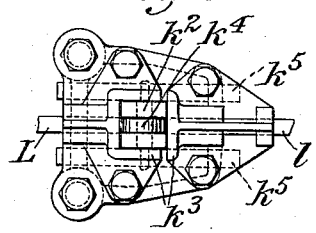
Figure 8:
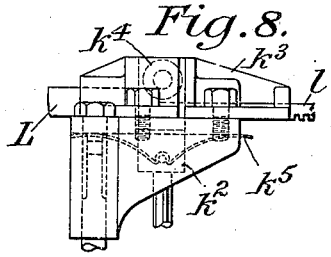
Figure 9:
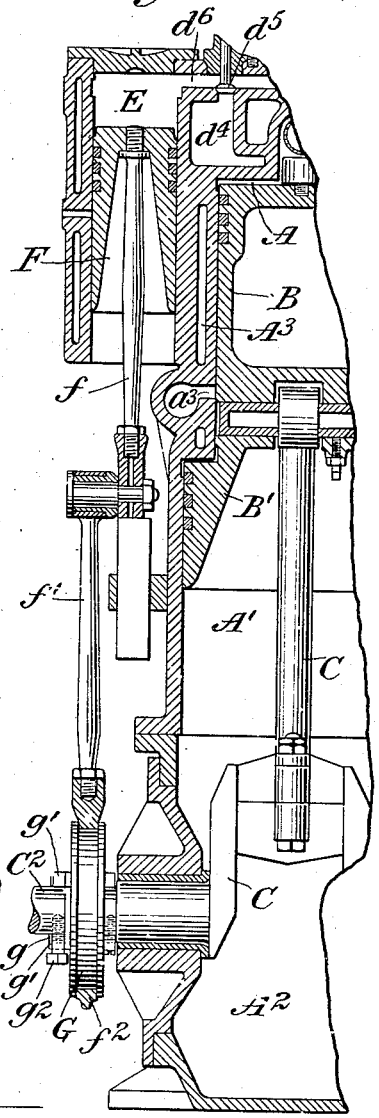
Figure 10:
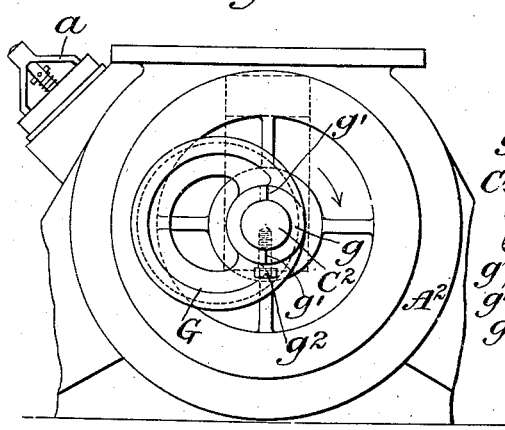
Figure 11:
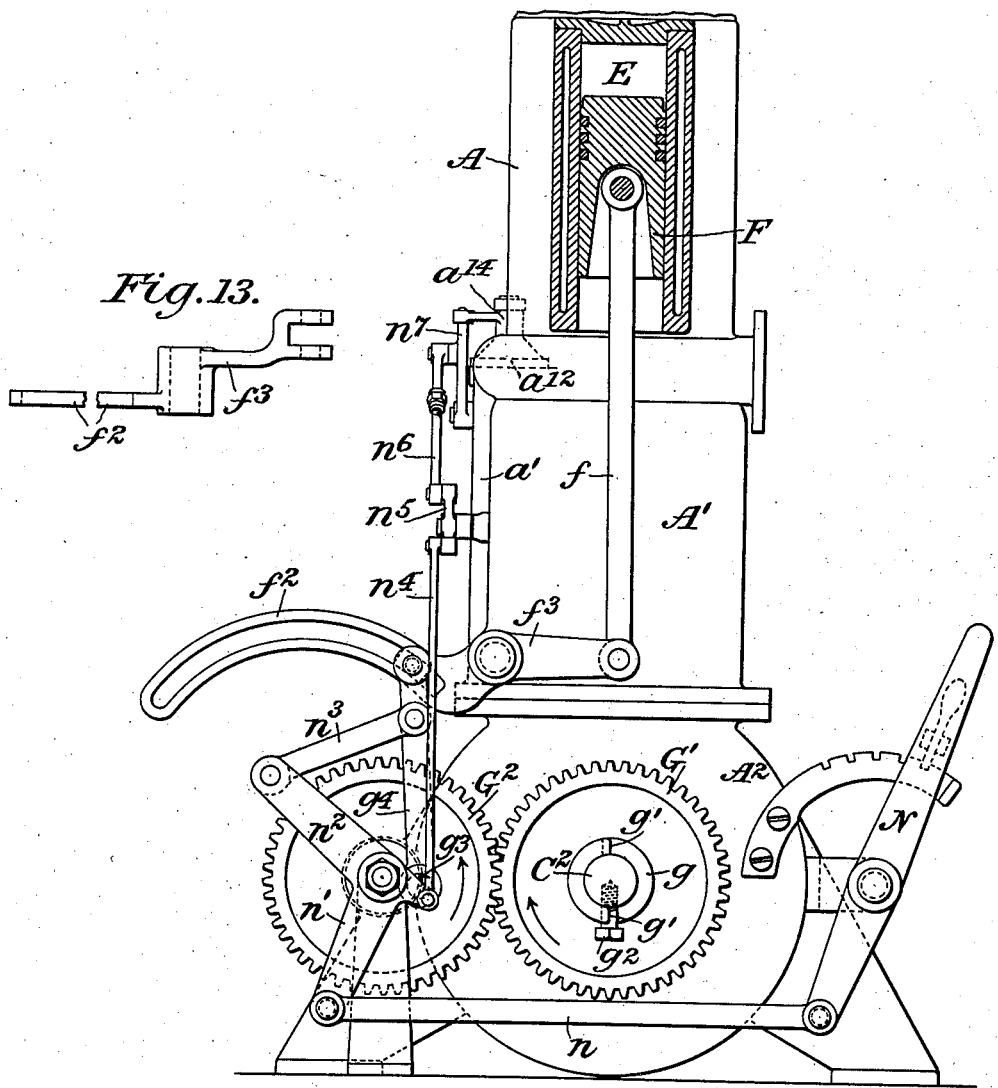
Figure 12:
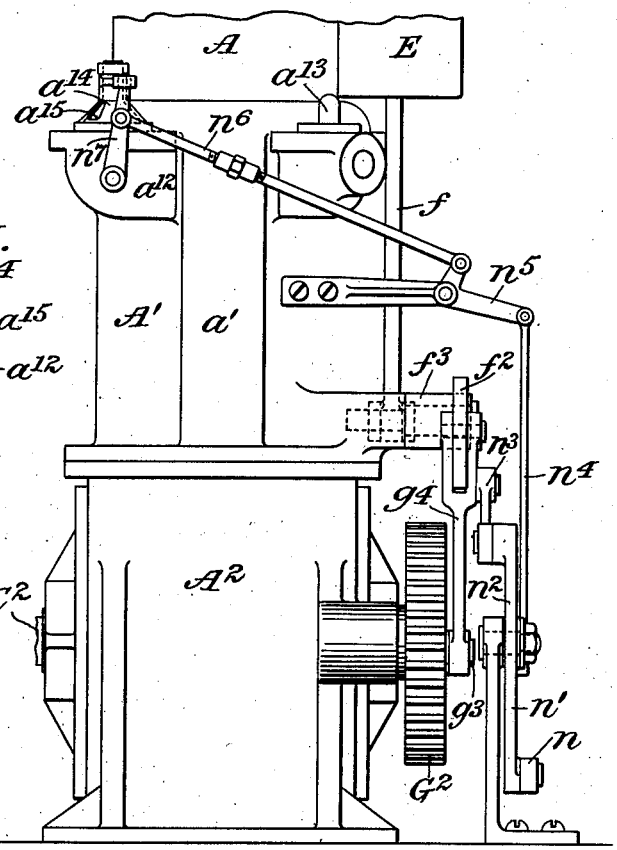
Figure 14:
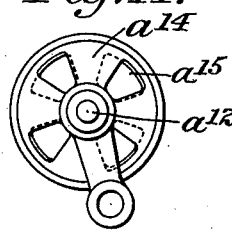

The invention will be more particularly described hereinafter with reference to the accompanying drawings in which, for purposes of illustration and explanation of the nature of the invention, it is illustrated as embodied in a convenient and practical form, and in which, Figure 1 is a view in vertical, central section of an engine which is constructed in accordance with the invention, the plane of section being in the direction of the crank shaft; Fig. 2 is a vertical, central section on a plane at right angles to that of Fig. 1; Fig. 3 is a plan view of the air tanks and air cooling means; Fig. 4 is a detail view in horizontal section on the plane indicated by the line 4—4 of Fig. 2; Figs. 5 and 6 are detail views in section on the planes indicated by the lines 5—5 and 6—6, respectively, of Fig. 4; Figs. 7 and 8 are detail views in plan and side elevation, respectively, of a portion of the devices for controlling the fuel inlet valve; Fig. 9 is a partial view in vertical, central section, on the same plane as that of Fig. 1, illustrating particularly the devices for securing a proper lead for the auxiliary compressor piston when the engine is reversed, if the compressor has been set for a lead; Fig. 10 is a detail view in side elevation illustrating the devices last referred to; Fig. 11 is a view in side elevation, partly in section, illustrating the devices which may be employed to vary the action of the auxiliary compressor and the amount of air admitted for compression; Fig. 12 is a view in elevation of some of the parts shown in Fig. 11, seen from the left in Fig. 11; Fig. 13 is a detail view of one of the levers shown in Figs. 11 and 12; Fig. 14 is a detail view of the valve which admits air to the main compression cylinder.

In the drawings, the engine which is selected for illustration as an embodiment of the invention is represented as a vertical engine having a working cylinder A and a compression cylinder A' in tandem, with a closed crank chamber $A^2$. The piston B is represented as an ordinary trunk piston having an enlarged forward end B' to fit the compression cylinder A'. The piston may be connected as usual by a pitman C with the cranks C' of the usual divided crank shaft $C^2$ which has its bearings in the side walls of the crank chamber $A^2$.

The crank chamber may be provided with a suitable inlet valve $a$ and may be connected by a pipe or channel $a'$ with an air inlet port $a^2$ formed in the wall of the working cylinder A and arranged to be uncovered by the piston B as it approaches the limit of its forward stroke. Exhaust ports $a^3$ are likewise provided in the wall of the working cylinder and are also arranged to be uncovered by the piston as it approaches the forward limit of its stroke but somewhat earlier than the inlet port $a^2$, so that the dead gases may be cleared out of the working cylinder as the forward stroke of the piston is completed, first, by the relief of pressure through the opening of the exhaust ports, and then by the inflow of air, under compression, from the crank chamber. The several exhaust ports $a^3$ communicate with a common exhaust pipe $a^4$ and the heat of the exhaust is made use of as hereinafter explained for the preheating of the fuel oil.

The working cylinder is further provided with a secondary exhaust port $a^5$ at the head end, the same having an exhaust valve $a^6$ which is controlled by eccentrics $a^7$ on the main shaft $C^2$ operating through an ordinary link motion $a^8$ and a rod $a^9$ having an adjustable projection $a^{10}$ upon the stem of the valve $a^6$. The exhaust from the port $a^5$ may be discharged through an exhaust pipe $a^{11}$ and be made use of to further aid in heating the fuel oil. The eccentrics $a^7$ are so placed as to cause the valve $a^6$ to open shortly after the piston has commenced its rearward stroke and to close just before the piston reaches the limit of its rearward stroke. By this means there is a slight compression of the mixture of air and such spent gases as remain in the cylinder after the piston commences its rearward stroke, which brings the air and gases to rest in the cylinder and obviates stratification. The subsequent opening of the secondary exhaust valve permits the air and such spent gases as remain to be further cleared out of the cylinder. The valve closes just long enough before the piston reaches the limit of its rearward movement to bring about a sufficient degree of compression to overcome the loss of heat through the air which has been supplied to the cylinder from the crank chamber and expelled, and such compression likewise reduces the amount of clearance between the end of the piston and the head of the cylinder which would otherwise be necessary. In this manner the burning gases which enter the cylinder lose but little of their efficiency in heating and compressing such air as remains between the piston and the cylinder head. Furthermore, this secondary exhaust valve makes it possible to reverse the engine at any time for which purpose the valve is operated through the link motion, so that the valve may have the proper lead over the piston and the pressure in the cylinder be relieved at the proper time to permit movement of the piston rearward.

Air is admitted to the compression cylinder $A^1$ during the forward stroke of the piston through a suitable inlet valve $a^{12}$, shown in detail in Fig. 5, and is discharged therefrom through an outlet valve $a^{13}$ shown in Fig. 6. From the latter it is conducted by a suitable pipe $d$, shown in Fig. 3, to a receiving tank D from which it is conducted through a header $d'$, a series of air cooling coils $d^2$ and a collecting header $d^3$ to a second tank or reservoir D' from which, having had its temperature suitably reduced, it is delivered to the jacket $A^3$ surrounding the working cylinder A, shown in Fig. 2, for the purpose of keeping the temperature of the working cylinder within suitable limits, the air being also heated and expanded and the efficiency thus increased. Having thus accomplished the cooling of the working cylinder, this air, which already has been compressed to some extent in the compression cylinder A', may be further compressed before it is delivered to the working cylinder to support combustion therein. For this purpose the air may be delivered through a suitable channel $d^4$ and check valve $d^5$ and channel $d^6$ to an auxiliary compression cylinder E. The auxiliary compression piston F may be operated by a piston rod $f$ and pitman $f'$ and eccentric strap $f^2$ from an eccentric G on the crank shaft of the engine.

The air, further compressed in the cylinder E, and the fuel oil, are admitted together to the working cylinder, the admission thereof being controlled by a positively actuated valve as hereinafter described. The oil, supplied from any suitable source, may be delivered through a pipe H, which may have a coil $h$ within the exhaust pipe $a^4$ in order that the oil may be heated before delivery to the valve chamber K which may be formed in a suitable casting formed with or secured to the head of the working cylinder, the channel $d^6$ which leads to the auxiliary compression cylinder E, also communicating with the valve chamber K. The valve port $k$, through which the valve chamber K communicates with the vaporizer and igniter and the working cylinder is normally closed by the valve $k'$. The stem of the latter is secured to a block $k^2$ guided in a suitable bracket $k^3$ and provided with a roller $k^4$ which co-operates with a slide cam L. The latter is also guided in the bracket $k^3$ and may be operated, as represented in the drawing, by a rack $l$ engaged by a gear segment $l'$ mounted on a suitable bracket $l^2$ secured to the cylinder.

The gear segment may be connected as by a link $l^3$ with the slide rod $a^9$, before referred to, so that the valve $k'$ shall be opened at the proper instant with regard to the position of the piston whether the engine be driven in one direction or in the other. It is obvious that variation of the length of the link $l^3$ and variation of the engagement of the rack $l$ and gear segment $l'$ gives such elasticity in adjustment as to permit the operation of the inlet valve $k'$ and of the secondary exhaust valve $a^6$ to be regulated as may be required according to the conditions under which the engine is operated. The valve $k'$ is held normally to its seat by a suitable spring or springs, shown at $k^5$ in Figs. 7 and 8, and is opened by the cam slide L, as will be readily understood. It will be observed also that the cam slide has movement in a right line and acts directly upon the valve stem, insuring positiveness and certainty in the admission of the charge to the working cylinder.

The air and oil from the valve chamber K are preferably discharged upon a spherical or globular distributer, vaporizer and igniter M which is located within a recess $m$ formed therefor in the head casting of the cylinder. The construction and arrangement of this distributer vaporizer and igniter is preferably as fully described in the application of the same inventor for Letters Patent of the United States, Serial No. 197,512, filed March 10, 1904.

To accommodate the action of the auxiliary compressor E to the reversal of the engine, it is necessary that provision be made for changing the lead of the piston F when the compressor has a lead. Accordingly, as illustrated in Figs. 9 and 10, the eccentric G may be mounted loosely on the shaft $C^2$ and the hub $g$ thereof be extended and cut away to form two shoulders $g'$ at substantially opposite points for co-operation with a pin or screw $g^2$ fixed in the shaft $C^2$. In forward motion, therefore, the eccentric will be driven by one of said shoulders $g'$, while in reverse motion the eccentric will be driven by the other of said shoulders and a relative change of position of the eccentric upon the shaft 8 180° will take place, thus changing the lead of the piston F as required for the reversal of the engine when the compressor has a lead.

In reversing the engine, as the link $a^8$ is moved so as to reduce the travel of the operating rod $a^9$ the lift of the secondary exhaust valve will be progressively lessened and consequently an increasing amount of the exhaust gases will be retained in the working cylinder and compressed therein until, finally, the quantity of gases so retained will be so great that the momentum of the engine (which has obviously been reduced in speed because of the work expended in compressing the progressively increasing quantities of exhaust gases retained in the cylinder) will be insufficient to complete the compression of the gases retained in the cylinder. When this condition has been reached, the piston will stop upon its up stroke and before the completion thereof, and the gases retained in the cylinder will reëxpand and give the piston an impulse in a reverse direction from that in which it was previously moving, whereupon the proper shoulder $g'$ will engage the eccentric G to operate the auxiliary compressor E in proper time relative to the working piston to secure the operation of the engine in a reverse direction.

If the engine is used as a stationary engine and it is desired to regulate the engine according to the load, it is obviously necessary to vary the quantity of air which is introduced to form the burning mixture in the cylinder, in order that the engine may not be made to do unnecessary work in compression. Devices which may be employed for this purpose are represented in Figs. 11 to 14, in which the eccentric G of Fig. 1 is represented as replaced by a gear G' which drives a gear $G^2$. The latter is provided with a crank pin $g^3$ which is engaged by an adjustable link or pitman $g^4$. The latter engages loosely one arm $f^2$ of a lever $f^3$ to the other arm of which the piston rod $f$ of the auxiliary compressor piston F is connected.

The arm $f^2$ is curved concentrically with the path of motion of the crank pin $g^3$ and the arm $g^4$ is adjustable thereon so that the throw of the arm $f^2$ and consequently the movement of the piston F may be varied as desired according to the quantity of air compressed in the first compressor, while the piston F shall move always to the same point in the cylinder. The arm $g^4$ may be shifted through a suitable system of levers $n$, $n'$, $n^2$, $n^3$ from a controlling handle N which may also be connected by a suitable system of levers $n^4$, $n^5$, $n^6$ $n^7$ with a cap $a^{14}$ over the inlet valve $a^{12}$ of the compression cylinder A'. The cap $a^{14}$ has openings corresponding with openings through the valve head $a^{15}$, so that through the rotation of the cap $a^{14}$ the admission of air to the compression cylinder, on its suction stroke, may be restricted, the air in such compression cylinder being therefore somewhat rarefied so that a lesser volume of air is supplied to the auxiliary compression cylinder E for final compression and admission to the working cylinder.

In describing the operation of the engine it will be assumed, first, that the piston B is at the forward limit of its stroke, as represented in Fig. 2. As it approaches this position the exhaust ports $a^3$ were opened, permitting the escape of the expanded gases, and immediately thereafter the air inlet port $a^2$ was opened, permitting the air to rush in from the crank chamber and clear out the remaining dead gases. The compression cylinder A', in this position of the piston is filled with air at atmospheric pressure admitted through the valve $a^{12}$.

As the piston begins its rearward movement the primary exhaust ports $a^3$ of the working cylinder are closed and thereafter a slight compression takes place until the secondary exhaust valve $a^6$ is opened. The expulsion of air and the remaining spent gases from the cylinder then goes on until the piston approaches the limit of its rearward stroke, when the secondary valve is closed and during the slight rearward movement of the piston, compression takes place. Meanwhile the air compressed by the rearward movement of the main compression piston B' passes into the receiving tank D through the cooling coils $d^2$, into the reservoir D', and thence into the jacket of the main cylinder. From this it passes into the jacket of the auxiliary compressor and thence into the chamber $d^4$ from which it is admitted behind the auxiliary piston F and is further compressed by the forward movement thereof. Just as the main piston commences its forward movement, the valve $k'$ is opened and the air from the compression cylinder E passes into the working cylinder, carrying with it the fuel oil. The oil is immediately vaporized and ignited and the pressure of the burning mixture acts upon the main piston.

It will be understood that the engine as described herein operates by relatively slow expansion and that the working pressure employed is comparatively low, rarely rising, under suitable working conditions, above 120 pounds. The pressure in the auxiliary compressor and therefore resting upon the valve $k'$ is practically equal to the pressure in the working cylinder and the working force is derived from the expansion of the air and gases in combustion behind the larger working piston.

It will be evident that various changes and arrangement of the engine to meet various conditions of use, may be made without departing from the spirit of the invention.

I claim as my invention:

1. In a slow combustion engine, the combination of a working cylinder having an inlet port for the charge, an air inlet port at the forward end of the working cylinder, exhaust ports slightly in advance of the air inlet port, a secondary exhaust valve controlled port at the head of the working cylinder, a positively operated valve to control said charge inlet port, means to deliver fuel oil to said valve-controlled port, an igniter within the head of the cylinder, a compression cylinder, a closed crank chamber, a connection between the crank chamber and the air inlet port leading into the working cylinder, a connection between the compression cylinder and the valve-controlled charge inlet port, valve operating means to open said valve after the piston of the working cylinder completes its rearward stroke, and means carried by said valve operating means for opening the secondary exhaust valve, whereby the air under pressure from said compression cylinder is admitted to the working cylinder during the forward movement of the piston therein simultaneously with the fuel oil; substantially as described.

2. In a slow combustion engine, the combination of a working cylinder having an inlet port for the charge, an air inlet port at the forward end of the working cylinder, and exhaust ports slightly in advance of the air inlet port, a positively operated valve to control said charge inlet port, a secondary exhaust valve-controlled port at the head of the working cylinder, means to deliver fuel oil to said valve-controlled charge inlet port, an igniter within the head of the cylinder, a compression cylinder in tandem with the working cylinder, a closed crank chamber, a piston in the working cylinder and having a portion fitted to the compression cylinder, a connection between the crank chamber and the air inlet port leading into the working cylinder, a connection between the compression cylinder and the charge inlet port, valve operating means to open said valve after the piston of the working cylinder completes its rearward stroke, and means carried by said valve operating means for opening the secondary exhaust valve, whereby the air under pressure from said compression cylinder is admitted to the working cylinder during the forward movement of the piston therein simultaneously with the fuel oil; substantially as described.

3. In a slow combustion engine, the combination of a working cylinder having at its head an inlet port for the charge, an air inlet port at the forward end of the working cylinder, exhaust ports slightly in advance of the air inlet port, both said ports being uncovered by the piston as it reaches the forward limit of its stroke, a secondary exhaust valve controlled port at the head of the working cylinder, a positively operated valve to control said charge inlet port, a single valve operating device for operating said secondary exhaust valve and said charge inlet valve, means to deliver fuel oil to said valve-controlled charge inlet port, a compression cylinder and a connection between the compression cylinder and the air inlet port, an igniter within the head of the cylinder, means to deliver air under pressure to said air inlet port, and independent means to deliver air under pressure to said charge inlet port during the forward stroke of the piston in the working cylinder and simultaneously with the fuel oil; substantially as described.

4. In an engine, the combination of a working cylinder having at its head an inlet port for the charge, an air inlet port at the forward end of the working cylinder, exhaust ports slightly in advance of the air inlet port, both said ports being uncovered by the piston as it approaches the limit of its forward movement, a secondary exhaust valve-controlled port at the head of the working cylinder, a positively operated valve to control said charge inlet port, a single valve operating device for operating said secondary exhaust valve and said charge inlet valve, means to deliver fuel oil to said valve-controlled charge inlet port, an igniter within the head of the cylinder, a compression cylinder, a closed crank chamber, a connection between the crank chamber and the air inlet port, a connection between the compression cylinder and the charge inlet port, and means to open said charge inlet port valve after the piston of the working cylinder completes its rearward stroke, whereby the air under pressure from said compression cylinder is admitted to the working cylinder during the forward movement of the piston therein simultaneously with the fuel oil; substantially as described.

5. In a slow combustion engine, the combination of a working cylinder having an inlet port for the charge, an independent air port, in the forward end of the cylinder, exhaust ports slightly in advance of the air port, and arranged to be opened as the piston approaches the limit of its forward stroke, and a secondary exhaust port at the head of the working cylinder, a reversing gear to open said secondary exhaust port, a valve to control said inlet charge port, means to open said valve after the piston completes its rearward stroke, means to deliver oil to said valve-controlled inlet charge port, an igniter within the head of the cylinder, a compression cylinder, a closed crank chamber, a connection between the crank chamber and the air port, and a connection between the compression cylinder and said valve-controlled inlet charge port, whereby air is delivered to the working cylinder after the piston completes its rearward stroke; substantially as described.

6. In a slow combustion engine, the combination of a working cylinder having an inlet for the fuel charge, a valve to control said inlet, means to open said valve after the piston completes its rearward stroke, an air port in the forward end of the cylinder, exhaust ports slightly in advance of the air port, an igniter, a fuel oil supply, a compression cylinder and connections between it and the air port, an air compressor, a connection from said compressor to said valve-controlled inlet charge port, and means to vary the throw of the air compressor in one direction only according to the load on the engine; substantially as described.

7. In a slow combustion engine, the combination of a working cylinder having an inlet for the fuel charge, a positively operated valve to control said inlet, an igniter, a fuel oil supply, a main air compressor, an auxiliary air compressor receiving air from the main compressor and delivering it to said valve-controlled inlet, means to vary the admission of air to the main compressor, and means to vary the throw of the auxiliary compressor according to the load of the engine; substantially as described.

8. In a slow combustion engine, a cylinder comprising a working chamber; an air compressing chamber of larger diameter than said working chamber and abutting therewith; a piston comprising a working portion moving in said working chamber and an enlarged compressing portion moving in said compressing chamber; a charge inlet port leading into said working chamber; a positively operated valve controlling said port; operating mechanism adapted to open said valve during the working stroke of said piston; a storage reservoir for storing air compressed by the aforesaid air compressor; a second air compressor deriving its supply from said reservoir, said second compressor discharging into said charge inlet port; and means for supplying fuel oil to said charge inlet port.

9. In a slow combustion engine, a cylinder comprising a working chamber; an air compressing chamber of larger diameter than said working chamber and abutting therewith; a piston comprising a working portion moving in said working chamber and an enlarged compressing portion moving in said compressing chamber; a closed crank case wherein air to scavenge said working chamber is compressed by said piston during the rearward stroke thereof; supply and exhaust ports for admitting said scavenging air to the working chamber and for permitting the exhaust of burned gases therefrom, both said ports being overrun by said piston; a charge inlet port leading into said working chamber; a positively operated valve controlling said port; operating mechanism adapted to open said valve during the working stroke of said piston; a storage reservoir for storing air compressed by the aforesaid air compressor; a second air compressor deriving its supply from said reservoir, said second compressor discharging into said charge inlet port; and means for supplying fuel oil to said charge inlet port.

This specification signed and witnessed this seventh day of April, A. D. 1904.

ARTHUR B. GOODSPEED.

In the presence of—
ANTHONY N. JESBERA,
W. B. GREELEY.